United States Patent
Swaminathan et al.

(10) Patent No.: US 8,620,955 B2
(45) Date of Patent: Dec. 31, 2013

(54) UNIFIED FILE ACCESS ACROSS MULTIPLE PROTOCOLS

(75) Inventors: Balaji Swaminathan, Bangalore (IN); Gururajan Raghavendran, Bangalore (IN)

(73) Assignee: Novell, Inc., Provo, UT (US)

( * ) Notice: Subject to any disclaimer, the term of this patent is extended or adjusted under 35 U.S.C. 154(b) by 724 days.

(21) Appl. No.: 12/405,362

(22) Filed: Mar. 17, 2009

(65) Prior Publication Data
US 2010/0241667 A1 Sep. 23, 2010

(51) Int. Cl.
*G06F 7/00* (2006.01)

(52) U.S. Cl.
USPC .......................................... 707/785; 707/694

(58) Field of Classification Search
USPC .................................. 707/694, 785
See application file for complete search history.

(56) References Cited

U.S. PATENT DOCUMENTS

| | | | |
|---|---|---|---|
| 5,608,865 A * | 3/1997 | Midgely et al. | 714/1 |
| 5,889,952 A | 3/1999 | Hunnicutt et al. | |
| 6,490,625 B1 * | 12/2002 | Islam et al. | 709/229 |
| 7,398,311 B2 | 7/2008 | Joshi et al. | |
| 7,457,822 B1 | 11/2008 | Barrall et al. | |
| 2003/0191846 A1 | 10/2003 | Hunnicutt et al. | |
| 2005/0086491 A1 * | 4/2005 | Haugh et al. | 713/182 |
| 2006/0101019 A1 * | 5/2006 | Nelson et al. | 707/9 |
| 2006/0123005 A1 * | 6/2006 | Burnett et al. | 707/9 |
| 2006/0294051 A1 * | 12/2006 | Kapadia et al. | 707/1 |
| 2008/0130042 A1 * | 6/2008 | Iizuka et al. | 358/1.15 |
| 2009/0119750 A1 * | 5/2009 | Sembugamoorthy et al. | 726/3 |

* cited by examiner

*Primary Examiner* — Cheyne D Ly
(74) *Attorney, Agent, or Firm* — Schwegman Lundberg & Woessner, P.A.

(57) ABSTRACT

Apparatus, systems, and methods may operate to construct a file system tree that includes files to be accessed according to a plurality of custom access control list (ACL) access mechanisms registered by a corresponding plurality of applications, or a default ACL access mechanism. To access the files, metadata can be read/written using a multiple protocol file system cache engine and one of the ACL access mechanisms. In some embodiments, operations may include registering, in response to a request by an application, a selected one of the plurality of custom ACL access mechanisms with a library coupled to a multiple protocol file system cache engine. Further operations may include accessing a file system through the multiple protocol file system cache engine using the selected one of the plurality of custom ACL access mechanisms, or a default ACL access mechanism. Additional apparatus, systems, and methods are disclosed.

27 Claims, 4 Drawing Sheets

UNIFIED FILE ACCESS ACROSS MULTIPLE PROTOCOLS

BACKGROUND

A variety of protocols can be used to access files in a file system. These include the Apple Filing Protocol (AFP), the Common Internet File System (CIFS), and the Network Control Program (NCP) protocols. Indeed, each application running on a standalone machine, or within a network may use a separate protocol to access files.

When file locking is implemented between applications that access the files in a file system, and the access is accomplished using different protocols, there is currently no unified mechanism that can be used to inform one application that a particular file has been locked by another. In some cases, individual communication channels are opened between applications to communicate such information, so that the number of channels opened increases at least in proportion to the number of applications.

SUMMARY

In various embodiments, apparatus, systems, and methods that support unified file access operations are provided. For example, in some embodiments, such access is implemented by constructing a file system tree that includes files to be accessed according to a plurality of custom access control list (ACL) access mechanisms registered by a corresponding plurality of applications, or a default ACL access mechanism. To access the files, metadata can be read/written using a multiple protocol file system cache engine and one of the plurality of custom ACL access mechanisms, or the default ACL mechanism.

In some embodiments, operations may include registering, in response to a request by an application, a selected one of a plurality of custom ACL access mechanisms with a library coupled to a multiple protocol file system cache engine. Further operations may include accessing the file system through the multiple protocol file system cache engine using the selected one of the plurality of custom ACL access mechanisms or a default ACL access mechanism. Additional embodiments are described, and along with the foregoing examples, will be set forth in detail below.

DETAILED DESCRIPTION

Figure 1:
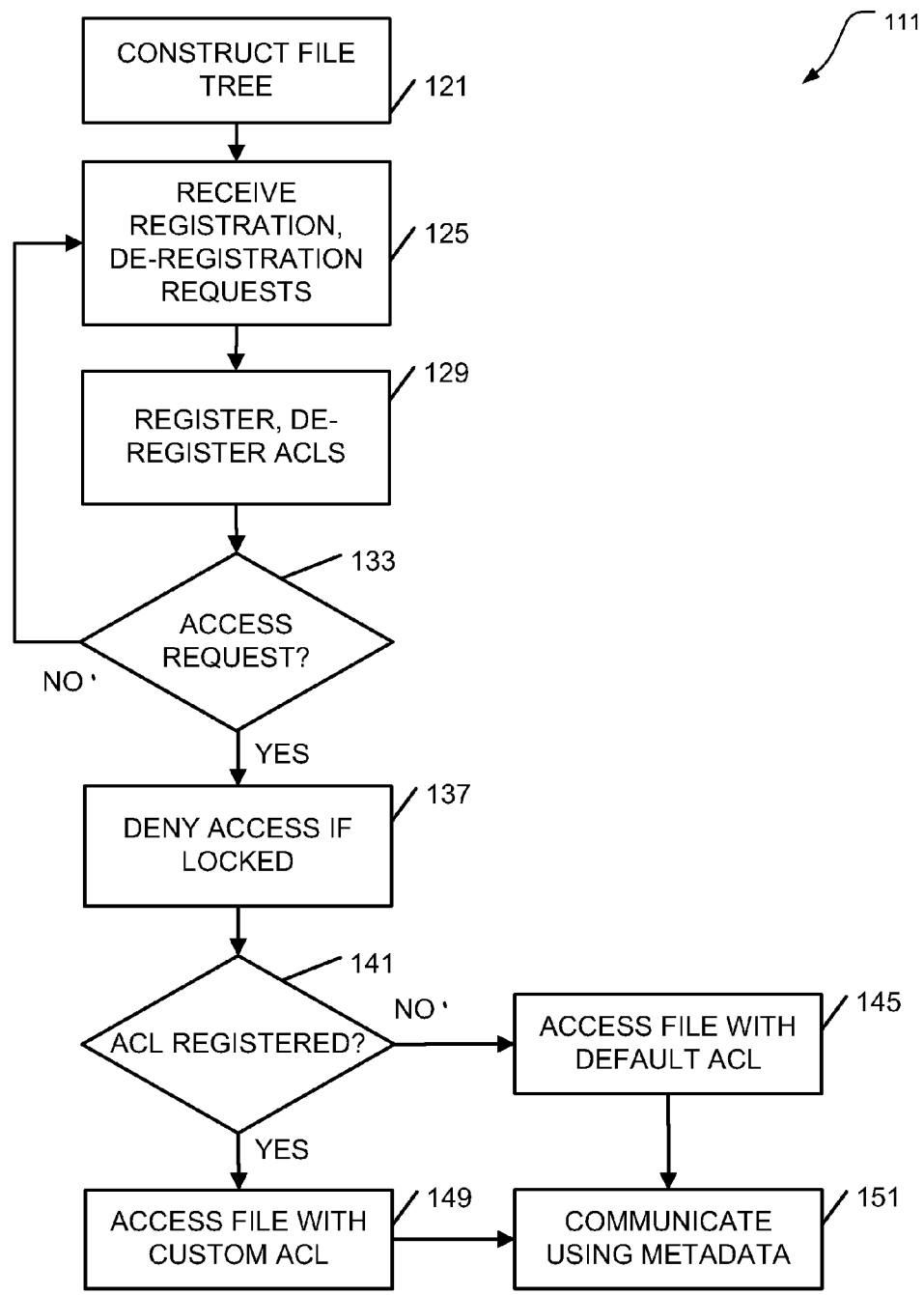
FIG. 1 is a flow diagram illustrating unified file access methods according to various embodiments of the invention.

Some of the challenges described above may be addressed by implementing a common interface to access files in a file system across multiple protocol types. For example, in some embodiments, a file access function library is used to register custom ACL access mechanisms associated with individual applications. Thereafter, file access by the registered applications can occur according to the registered custom mechanisms. Applications that have not registered a custom ACL access mechanism may access the files using a default ACL access mechanism. It should be noted that while the terms "application" and "service" can be used interchangeably herein, the term "application" will be used throughout the remainder of this document for reasons of economy and clarity.

In many embodiments, each file is associated with access conditions, which are stored in a metadata database. The database of metadata can be maintained by a multiple protocol file system cache engine, instead of individual applications, to provide additional efficiency. In this way, metadata associated with file access operations can be cached in a single location, consolidating communications between applications using multiple file access protocols, and providing a more controlled and refined access to files and folders. Efficiency can also be improved with respect to cross-protocol file locking by avoiding the use of special inter-process communication channels (e.g., remote procedure calls). Thus, instead of each application maintaining a cache and coordinating with every other application, a single consistent view of the cache serves to reduce the amount of interaction between applications.

The file system access mechanism as implemented herein may comprise two parts: a multiple protocol file system cache engine, and a library that interacts with the cache engine. This access mechanism may be implemented as part of a stand-alone system, or within a networked system.

The cache engine can operate to build a comprehensive file system tree that includes file system ACLs, and to read/write file system metadata associated with file access. The cache engine may be implemented as an abstraction layer between the file system and the applications that access the files in the file system. Thus, the cache engine can be used to provide the function of ACL mechanism verification.

The library permits applications to register callback functions with selectable granularity in their custom ACL access mechanisms. The library then operates to interact with the cache engine by exposing applications so that file access may occur. The applications, in turn, can operate to expose functions (e.g., the callback functions) using function pointers from the library that can be called using the cached meta data as file access parameters. The callback functions are called by the cache engine to implement the custom ACL access mechanisms. Thus, the library may include application interfaces to support: registering/de-registering of customized ACL access mechanisms, user file/directory access, file lock/unlock functionality, and consolidated file access information, among others.

For example, assume the existence of multiple applications that operate to access the file system via the cache engine. These application are coupled to the library, which is in turn coupled to the cache engine. The cache engine can be used to dynamically load the library so that the applications can interact directly with the library. In this way, requests from the library go to the cache engine, which in turn calls registered ACL callback functions (or executes the default ACL access mechanism if none have been registered) to access the desired file. Thus, once an application requests access to a file, the ACL is used as a "filter" to provide access: either via the appropriate registered ACL custom access mechanism, or the default ACL access mechanism.

Even though the default ACL access mechanism does not necessarily use callback functions (as is the case with the custom ACL access mechanisms), the associated cache engine metadata can still be processed, contributing to efficiency and uniformity during file access operations. For example, the metadata can serve as a communication channel, so that applications attempting to access a locked file may be denied access via the cache engine, based on the metadata values, until the lock is removed. Cross-protocol locking functionality can support byte-range locks, opportunistic locks, and shared locks.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

FIG. 1 is a flow diagram illustrating unified file access methods 111 across multiple protocols according to various embodiments of the invention. The methods 111 are implemented in a machine-accessible and readable medium. The unified file access methods 111 are operational over processes within and among networks. The networks may be wired, wireless, or a combination of wired and wireless. The methods 111 may be implemented as instructions, which when accessed by a specific machine, perform the processing depicted in FIG. 1. Given this context, unified file access is now discussed with reference to FIG. 1.

In some embodiments, as viewed from the system hosting the multiple protocol file system cache engine and the library, a file tree is constructed, and then accessed according to registered custom ACL access mechanisms. If no custom ACL access mechanism is registered for an application, then a default (e.g., resident) ACL access mechanism is used.

Custom mechanisms may be developed for the Server Message Block (SMB), Data Access Page (DAP), AFP, NCP, and CIFS file access protocols, among others. Applications are permitted to individually register/de-register their custom ACL access mechanism with the library, as needed.

Thus, in some embodiments, a computer-implemented method 111 for implementing unified file access may begin at block 121 with constructing a file system tree including files to be accessed according to a plurality of custom ACL access mechanisms registered by the corresponding plurality of applications, or a default ACL access mechanism. In some embodiments, the multiple protocol file system cache engine may operate as a daemon process, including a UNIX® system daemon process. The multiple protocol file system cache engine may therefore operate to construct the file system tree using a daemon process.

The method 111 may continue on to block 125 with receiving requests for registration and de-registration of a plurality of custom ACL access mechanisms at a library operating as an interface between the multiple protocol file system cache engine and a plurality of applications.

The method 111 may continue on to block 129 with accepting registration and de-registration of the plurality of custom ACL access mechanisms at the library. In this way, the library is used as an interface between the applications and the multiple protocol file system cache engine.

The custom ACL access mechanisms may be registered with the library as callback functions that are used by the multiple protocol file system cache engine to implement the custom ACL access mechanisms. Thus, the activity at block 129 may include accepting registration of some of the plurality of custom ACL access mechanisms as callback functions associated with the plurality of applications. In this way, the callback functions can be used by the multiple protocol file system cache engine to access the files upon request by the plurality of applications.

Files can be locked and unlocked according to the custom ACL access mechanisms, if desired. Thus, the custom ACL access mechanisms and the default ACL access mechanism may include locking functions to lock and unlock access to some or all of the files.

Applications may also operate to de-register their custom ACL access mechanisms by sending a de-registration request (received as part of the activity of block 125) prior to ceasing execution. Thus, the activity at block 129 may comprise de-registering one or more of the plurality of custom ACL access mechanisms registered by a selected one of the plurality of applications in response to receiving a request from the application that has been selected.

The method 111 may loop back from block 133 to block 125, waiting for file access requests, perhaps registering/de-registering custom ACL access mechanisms as applications begin and end execution.

If a file access request is received, as determined at block 133, then the method 111 may continue on to block 137 with denying access (e.g., via the cached metadata) if the file requested has been locked. For example, the existence of a lock on a file can be communicated using the custom ACL access mechanisms, or the default access mechanism, from one application to another, via the metadata stored by the multiple protocol file system cache engine. Thus, the activity at blocks 133 and 137 may comprise receiving a request to access one of the files in the file system from a first application associated with a first one of the plurality of custom ACL access mechanisms, and then denying access to the first application by communicating, via the multiple protocol file system cache engine and the metadata, existence of a lock on the file placed by a second application using a second one of the plurality of custom ACL access mechanisms. If the file to which access has been requested is not locked, then the method 111 may continue on to block 141.

At block 141, it is determined whether the application requesting access has registered a custom ACL access mechanism with the library. If not, then the default ACL access mechanism, perhaps resident as part of the cache engine, can be used to access the file at block 145. That is, the activity at block 145 may comprise accessing the files using the default ACL access mechanism when an application requesting access to the files has not registered one of the plurality of custom ACL mechanisms with the library. Typically, the default ACL access mechanism does not implement callback functions provided by an application requesting access to the files. However, metadata to access the files can still be read/written by the multiple protocol file system cache engine when using the default ACL mechanism.

If it is determined that the application requesting access at block 133 has registered a custom ACL access mechanism with the library, then the method 111 may continue on to block 145 with reading or writing metadata to access the files using the multiple protocol file system cache engine and one or more of the plurality of custom ACL access mechanisms. Typically, the custom ACL access mechanism registered by an application is the mechanism used by that application to access the files.

Since the metadata is stored by the cache engine, applications can communicate their metadata to each other via cache engine operations. Thus, from blocks 145 or 149, the method 111 may continue on to block 151 with communicating at least some of the metadata between applications associated with at least two of the plurality of custom ACL access mechanisms, via the multiple protocol file system cache engine. Other embodiments may be realized.

Figure 2:
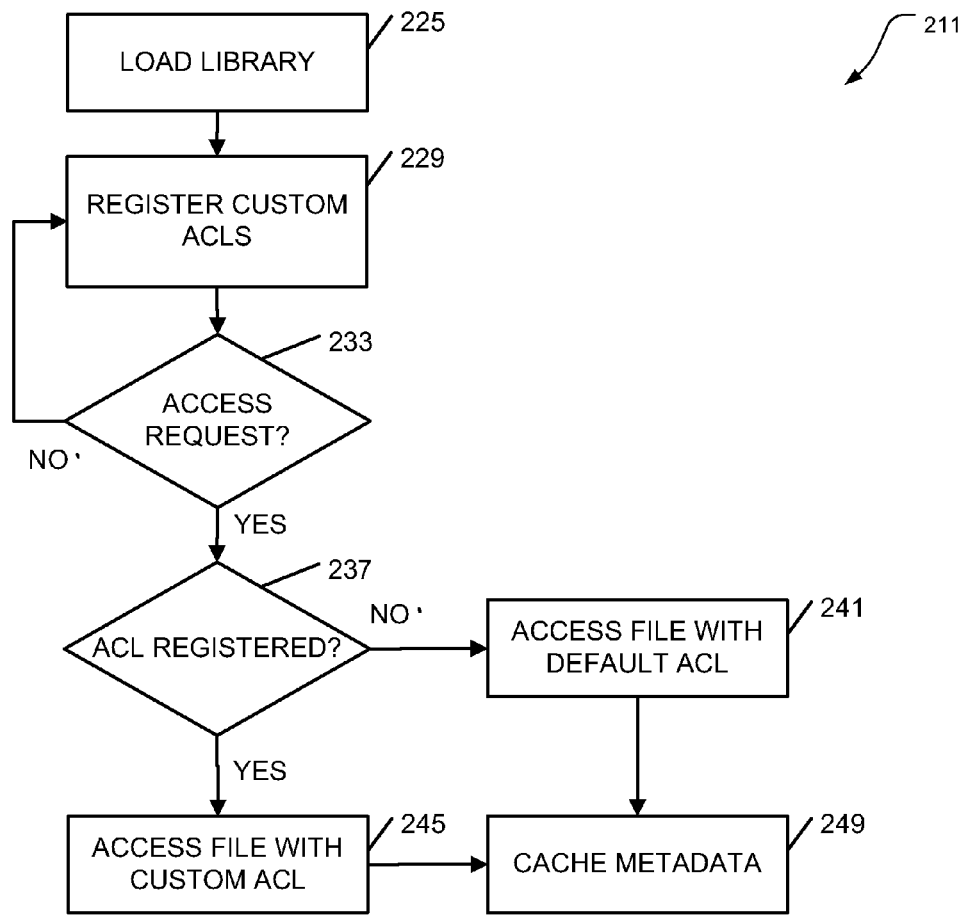
FIG. 2 is another flow diagram illustrating unified file access methods according to various embodiments of the invention.

For example, FIG. 2 is another flow diagram illustrating unified file access methods 211 according to various embodiments of the invention. In this case, unified file access is described with increased emphasis on the viewpoint of an application accessing a file. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

Thus, in some embodiments, to manage file access in a unified manner across multiple protocols, a method 211 may begin at block 221 with dynamically loading the library in conjunction with operating the multiple protocol file system cache engine. The library can be dynamically loaded so that the library is ready to receive requests for file access from applications as soon as the cache engine begins storing metadata.

The method 211 may continue on to block 229 with registering, in response to a request by an application, a selected one of a plurality of custom ACL access mechanisms with a library coupled to a multiple protocol file system cache engine. The method 211 may go on to loop between blocks 233 and 229, waiting for a file access request to be presented. Once it is determined, at block 233 that a file access request has been made, the method 211 may continue on to block 237 with determining whether a custom ACL access mechanism has been registered by the application attempting to access a file.

If a custom ACL access mechanism has not been registered at block 229, then the method 211 may continue on to block 241 with accessing the file system through the multiple protocol file system cache engine using a default ACL access mechanism. That is, the activity at block 241 may include accessing the file system through the multiple protocol file system cache engine using the default ACL access mechanism when an accessing application has not registered any of the plurality of custom ACL access mechanisms with the library.

If it is determined that a custom ACL access mechanism has been registered by the application attempting to access a file at block 237, the method 211 may continue on to block 245 with accessing the file system through the multiple protocol file system cache engine using a selected one of the plurality of custom ACL access mechanisms (e.g., the registered custom ACL access mechanism corresponding to the accessing application). As noted previously, the activity at block 245 may comprise accessing the file in the file system using callback functions associated with the application as function pointers into the library coupled to the application. This is because the function pointers may then be exposed as callback functions by the application attempting to access the files.

The metadata, which can be used by application callback functions to access files in the system via the multiple protocol file system cache engine, can be cached by the cache engine. Thus, from either one of the blocks 241 or 245, the method 211 may continue on to block 249 with caching metadata using the multiple protocol file system cache engine, perhaps with some of the metadata used as callback function arguments to access files in the file system.

The methods of managing file access shown in FIGS. 1 and 2 can be implemented in a computer-readable storage medium, where the methods are adapted to be executed by a processor. Further details of such embodiments will be provided below.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

Figure 3:
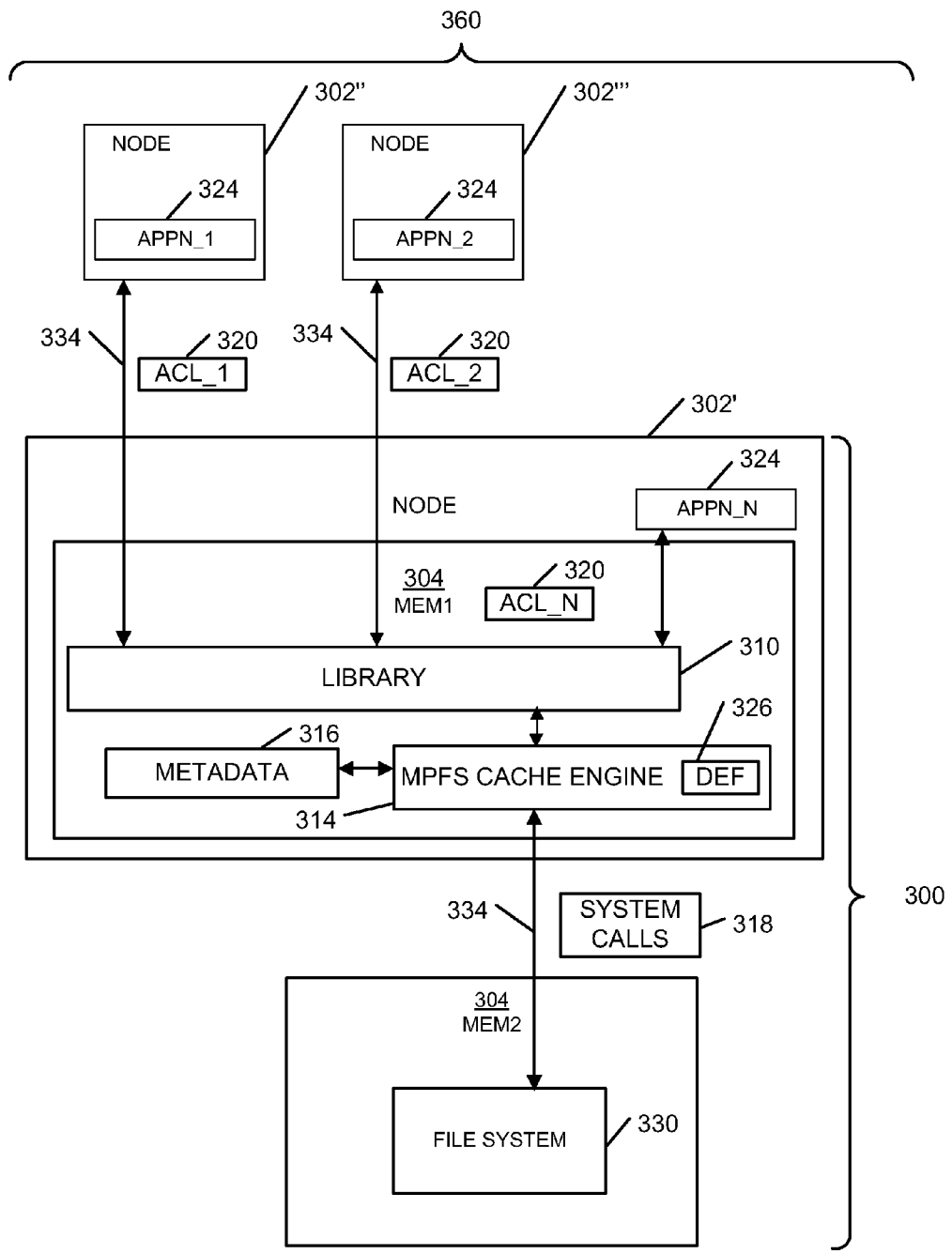
FIG. 3 is a block diagram of unified file access apparatus and systems according to various embodiments of the invention.

For example, FIG. 3 is a block diagram of unified file access apparatus 300 and systems 360 according to various embodiments of the invention. Here it can be seen that an apparatus 300 used to implement file access management may comprise one or more processing nodes 302, a library module 310, and a multiple protocol file system cache engine 314. The library module 310 can be used to register a plurality of custom ACL access mechanisms 320 corresponding to a plurality of applications 324. The cache engine 314 can be used to access a file system 330 using any one of the plurality of custom ACL access mechanisms 320 or a default ACL access mechanism 326. The applications 324 that contact the cache engine 314 via the library 310 can be networked (as shown), or operate in a stand-alone fashion.

The processing nodes 302 may comprise physical machines or virtual machines, or a mixture of both. The nodes 302 may also comprise networked entities, such servers and/or clients. The cache engine 314, which can be used by the applications 324 for improved file access performance, is an independent entity, and can operate as a daemon on the processing nodes 302.

The library 310 can be dynamically or statically linked by each application 324, and the library 310 can reside on a server. Applications 324 can also be part of the same node 302, or different nodes 302 (as shown). This structure can be extended on the application side by using a client-server architecture, where a server component of the application 324 is residing on the same node 302 as the cache engine 314, and the client component can be on any network node 302 that communicates with the server component, which in turn contacts the cache engine 314.

The apparatus 300 may operate to store some, or all of the file system 330 on a networked storage device 304. Thus, in some embodiments, the apparatus 300 comprises a network storage device 304 to couple to the processing node 302 and to store at least a portion of the file system 330.

Metadata 316 associated with the files in the file system 330 can be used to provide a single, consolidated point of reference for file access information, such as file lock information, that can be shared among the applications 324 attempting to access files in the file system 330. Thus, the apparatus 300 may comprise a memory 304 to couple to the processing node 302 and to store metadata 316 associated with files in the file system 330. The metadata 316 may be cached by the cache engine 314, and include a consolidated file locking information structure. Still further embodiments may be realized.

For example, it can be seen that a file access management system 360 may comprises multiple instances of the apparatus 300. The system might comprise a cluster of nodes 302, including physical and virtual nodes.

Thus, in some embodiments, a system 360 may comprise a first processing node 302' in a cluster of nodes 302, with a library module 310 included in the first processing node 302'. The library module 310 can be used to register, in response to a request by an application APPN_1 included in a second processing node 302" in the cluster of nodes 302, a first one ACL_1 of a plurality of custom ACL access mechanisms 320. The system 360 may further include a cache engine 314 to access a file system 330 using the custom ACL access mechanism ACL_1 or a default ACL access mechanism 326 (if the application APPN_1 has not registered the custom ACL access mechanism ACL_1 with the library 310). Each application 324 can register a separate custom ACL access mechanism 320, if desired.

Using cached metadata arising from operations involving the custom ACL access mechanisms, and the default ACL access mechanism, the cache engine 314 may serve as a communications channel between the applications, such as between one registered application APPN_1 and another registered application APPN_2. For example, the system 360 may include a third processing node 302''' in the cluster of nodes 302, the third processing node 302''' including a second application APPN_2 to register a second one of the plurality of custom ACL access mechanisms ACL_2 in response to a request by the second application APPN_2 to access the file system 330.

In this way, the cache engine 314 can facilitate communications between registered applications APPN_1, APPN_2 using the cached metadata 316. As noted previously, registration of a custom ACL access mechanism by an application serves to designate the system calls 318 in the cache engine that the library will use to access files in the file system. However, even if an application does not register a custom ACL access mechanism, the default ACL access mechanism can be used to process cached metadata, facilitating inter-application communication.

The unified file access apparatus 300 and system 360 may be implemented in a machine-accessible and readable medium that is operational over one or more networks (e.g., included in communication paths 334). The networks may be wired, wireless, or a combination of wired and wireless. The file access management apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
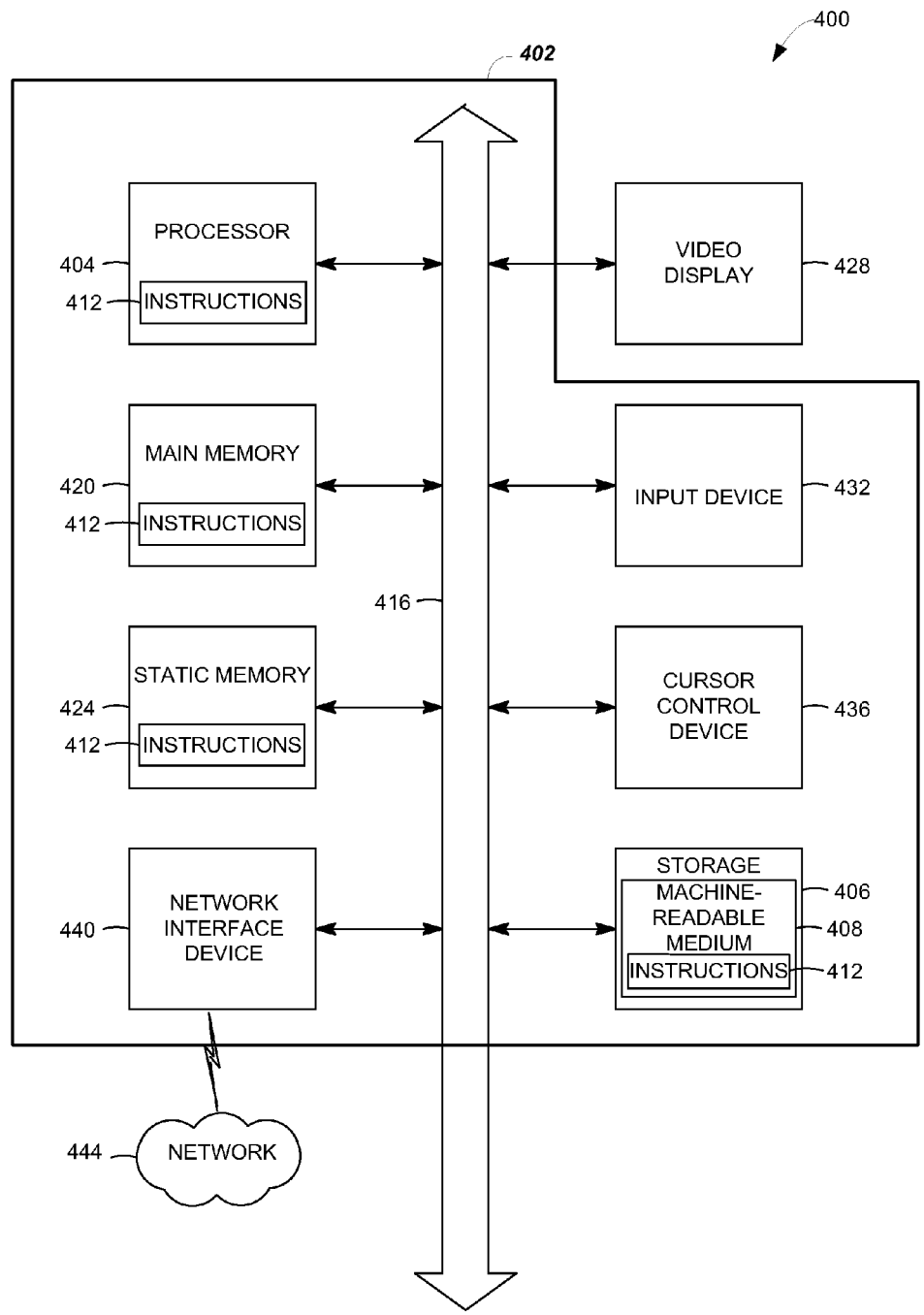
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any machine capable of executing a set of instructions (sequential or otherwise) that specify actions to be taken by that machine. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to make file access more efficient across multiple applications and protocols. Communication between applications, including the use of lock mechanisms, may also be improved. More efficient allocation of processing resources may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a processing node including at least one processor;
   a library module to register at least one of a plurality of custom access control list (ACL) access mechanisms in response to a request by a corresponding one of a plurality of applications; and
   a multiple protocol file system cache engine, to use the at least one processor to access a file system using cached metadata associated with one of the plurality of custom ACL access mechanisms when the one of the plurality of custom ACL access mechanisms has been registered, or a default ACL access mechanism when the one of the plurality of custom ACL access mechanisms has not been registered.

2. The apparatus of claim 1, further comprising:
   a network storage device to couple to the processing node and to store at least a portion of the file system.

3. The apparatus of claim 1, further comprising:
   a memory to couple to the processing node and to store metadata associated with files in the file system, the metadata to be cached by the multiple protocol file system cache engine, the metadata to include a consolidated file locking information structure.

4. A system, comprising:
   a first processing node in a cluster of nodes, the first processing node including at least one processor;
   a library module included in the first processing node to register, in response to a request by an application included in a second processing node in the cluster of nodes, at least one of a first one of a plurality of custom access control list (ACL) access mechanisms; and
   a multiple protocol file system cache engine, to use the at least one processor to access a file system using cached metadata associated with one of the first one of the plurality of custom ACL access mechanisms when the one of the first one of the plurality of custom ACL access mechanisms has been registered, or a default ACL access mechanism when the one of the first one of the plurality of custom ACL access mechanisms has not been registered.

5. The system of claim 4, wherein the multiple protocol file system cache engine is to serve as a communications channel between the application and another application that has registered a second one of the plurality of custom ACL access mechanisms with the library module.

6. The system of claim 4, further comprising:
   a third processing node in the cluster of nodes, the third processing node including a second application to register a second one of the plurality of custom ACL access mechanisms in response to a request by the second application to access the file system.

7. A processor-implemented method to execute on one or more processors that perform the method, comprising:
   constructing a file system tree including files to be accessed according to a plurality of custom access control list (ACL) access mechanisms registered in response to at least one request by a corresponding one of a plurality of applications, or according to a default ACL access mechanism; and
   reading metadata from or writing metadata to a cache to access the files using a multiple protocol file system cache engine and at least one of the plurality of custom ACL access mechanisms when the at least one of the plurality of custom ACL access mechanisms has been registered, or the default ACL mechanism when the at least one of the plurality of custom ACL access mechanisms has not been registered.

8. The method of claim 7, further comprising:
   communicating at least some of the metadata between applications associated with at least two of the plurality of custom ACL access mechanisms via the multiple protocol file system cache engine.

9. The method of claim 7, wherein the multiple protocol file system cache engine operates as a daemon process, and wherein the constructing comprises:
   constructing the file system tree using the daemon process.

10. The method of claim 7, further comprising:
    accepting registration and de-registration of some of the plurality of custom ACL access mechanisms at a library operating as an interface between the multiple protocol file system cache engine and the plurality of applications.

11. The method of claim 7, further comprising:
    accepting registration of some of the plurality of custom ACL access mechanisms as callback functions associated with the plurality of applications, wherein the callback functions are used by the multiple protocol file system cache engine to access the files upon request by the plurality of applications.

12. The method of claim 7, wherein some of the plurality of custom ACL access mechanisms include locking functions to lock and unlock access to some of the files.

13. The method of claim 7, further comprising:
    accessing the files using a selected one of the plurality of custom ACL access mechanisms when an application requesting access to the files has registered the selected one of the plurality of custom ACL mechanisms with the library.

14. The method of claim 7, further comprising:
accessing the files using the default ACL access mechanism when an application requesting access to the files has not registered one of the plurality of custom ACL mechanisms with the library.

15. The method of claim 7, wherein the default ACL access mechanism does not implement callback functions provided by an application requesting access to the files.

16. The method of claim 7, further comprising:
receiving a request to access one of the files from a first application associated with a first one of the plurality of custom ACL access mechanisms; and
denying access to the first application by communicating, via the multiple protocol file system cache engine and the metadata, existence of a lock on the one of the files placed by a second application using a second one of the plurality of custom ACL access mechanisms.

17. The method of claim 16, further comprising:
de-registering one of the plurality of custom ACL access mechanisms registered by a selected one of the plurality of applications in response to receiving a request from the selected one of the applications.

18. A processor-implemented method to execute on one or more processors that perform the method, comprising:
registering, in response to a request by a corresponding one of a plurality of applications, at least a selected one of a plurality of custom access control list (ACL) access mechanisms with a library coupled to a multiple protocol file system cache engine having access to cached metadata; and
accessing a file system through the multiple protocol file system cache engine and the cached metadata using the selected one of the plurality of custom ACL access mechanisms when the selected one of the plurality of custom ACL access mechanisms has been registered, or a default ACL access mechanism when the selected one of the plurality of custom ACL access mechanisms has not been registered.

19. The method of claim 18, wherein the accessing further comprises:
accessing a file in the file system using callback functions associated with an accessing application as function pointers into the library coupled to the accessing application.

20. The method of claim 18, further comprising:
caching metadata using the multiple protocol file system cache engine, some of the metadata to be used as callback function arguments to access files in the file system.

21. The method of claim 18, further comprising:
dynamically loading the library in conjunction with operating the multiple protocol file system cache engine.

22. The method of claim 18, wherein the accessing comprises:
accessing the file system through the multiple protocol file system cache engine using the selected one of the plurality of custom ACL access mechanisms when an accessing application has registered the selected one with the library.

23. The method of claim 18, wherein the accessing comprises:
accessing the file system through the multiple protocol file system cache engine using the default ACL access mechanism when an accessing application has not registered any of the plurality of custom ACL access mechanisms with the library.

24. The apparatus of claim 1, wherein the plurality of applications comprises a first application and a second application, wherein the first and second applications are configured to access the file system using a first protocol and second protocol, respectively.

25. The apparatus of claim 24, wherein the multiple protocol file system cache engine is configured to deny an access to a file requested by the first application upon determination that the file is locked by the second application.

26. The apparatus of claim 24, wherein the multiple protocol file system cache engine is configured to inform the first application that a file requested by the first application is locked by the second application.

27. The apparatus of claim 1, wherein the one of the plurality of custom ACL access mechanisms used by the multiple protocol file system cache engine to access the file system comprises a custom ACL access mechanism registered by the corresponding one of the plurality of applications that requests to access the file system.

* * * * *